US012292210B2

United States Patent
Yamana et al.

(10) Patent No.: US 12,292,210 B2
(45) Date of Patent: May 6, 2025

(54) DEHUMIDIFYING MEMBER, DEHUMIDIFYING ROTOR, AND MANUFACTURING METHOD OF DEHUMIDIFYING MEMBER

(71) Applicant: NICHIAS CORPORATION, Tokyo (JP)

(72) Inventors: Kazuki Yamana, Tokyo (JP); Masaaki Koubara, Tokyo (JP); Yuuma Tomitsuka, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 220 days.

(21) Appl. No.: 17/999,035

(22) PCT Filed: May 18, 2021

(86) PCT No.: PCT/JP2021/018770
§ 371 (c)(1),
(2) Date: Nov. 16, 2022

(87) PCT Pub. No.: WO2021/235429
PCT Pub. Date: Nov. 25, 2021

(65) Prior Publication Data
US 2023/0175713 A1 Jun. 8, 2023

(30) Foreign Application Priority Data
May 20, 2020 (JP) .................................. 2020-088096

(51) Int. Cl.
*F24F 3/14* (2006.01)
*B01D 53/28* (2006.01)
(Continued)

(52) U.S. Cl.
CPC ............ *F24F 3/1423* (2013.01); *B01D 53/28* (2013.01); *B01J 20/10* (2013.01); *B01J 20/30* (2013.01);
(Continued)

(58) Field of Classification Search
CPC ... B01J 20/10; C01B 33/154; B01D 2253/106
See application file for complete search history.

(56) References Cited

U.S. PATENT DOCUMENTS

| 4,886,769 A | 12/1989 | Kuma et al. |
| 4,911,775 A | 3/1990 | Kuma et al. |

(Continued)

FOREIGN PATENT DOCUMENTS

| CN | 1597045 A | | 3/2005 | |
| CN | 101544375 A | * | 9/2009 | .............. B01J 20/10 |

(Continued)

OTHER PUBLICATIONS

International Search Report, dated Jun. 29, 2021 for corresponding International Application No. PCT/JP2021/018770 with English translation (5 pages).

(Continued)

*Primary Examiner* — Ana M Vazquez
(74) *Attorney, Agent, or Firm* — Intellectual Property Law Group LLP

(57) ABSTRACT

An object is to provide a dehumidifying member having a high tensile strength. The object can be achieved by a dehumidifying member including a honeycomb structure. The honeycomb structure includes a planar base material and a corrugated base material, a contact part where a wave top portion of the corrugated base material and the planar base material are in contact with each other, and an air hole. The contact part includes an adhesion part adhered by an adhesive agent and silica gel formed on the air hole side (Continued)

from the contact part. The component forming the adhesive agent differs from the component of the silica gel formed on the air hole side from the adhesion part.

16 Claims, 5 Drawing Sheets

(51) Int. Cl.
    *B01J 20/10*     (2006.01)
    *B01J 20/30*     (2006.01)
    *C01B 33/154*     (2006.01)
    *D21H 17/68*     (2006.01)

(52) U.S. Cl.
    CPC ........... *C01B 33/154* (2013.01); *D21H 17/68* (2013.01); *F24F 2203/1036* (2013.01); *F24F 2203/1048* (2013.01); *F24F 2203/1068* (2013.01)

(56) References Cited

U.S. PATENT DOCUMENTS

| | | | |
|---|---|---|---|
| 5,435,958 | A | 7/1995 | Dinnage et al. |
| 2005/0022671 | A1 | 2/2005 | Yamazaki et al. |
| 2019/0247828 | A1 | 8/2019 | Ishizawa et al. |

FOREIGN PATENT DOCUMENTS

| | | |
|---|---|---|
| CN | 109891015 A | 6/2019 |
| JP | S61-252497 A | 11/1986 |
| JP | 2001-149735 A | 6/2001 |
| JP | 2002046198 A | 2/2002 |
| JP | 2004-209420 A | 7/2004 |
| JP | 2006205122 A | 8/2006 |
| JP | 2007-260582 A | 10/2007 |
| JP | 4958459 B2 | 6/2012 |
| WO | WO 2018079529 A1 | 5/2018 |

OTHER PUBLICATIONS

Written Opinion of the ISA, dated Jun. 29, 2021 for corresponding International Application No. PCT/JP2021/018770 with English translation (4 pages).
Japan first Office Action, dated Aug. 3, 2020, 2020 for corresponding Japanese Patent Application No. JP2020-088096 with English translation (4 pages).
Japan second Office Action, dated Nov. 9, 2020 for corresponding Japanese Patent Application No. JP2020-088096 with English translation (4 pages).
Japan third Office Action, dated Apr. 5, 2021, 2021 for corresponding Japanese Patent Application No. JP2020-088096 with English translation (11 pages).
China Office Action, dated Mar. 29, 2024 for corresponding China application No. 202180031305.7 with English translation (17 pages).
European Extended European Search Report, dated May 13, 2024 for corresponding European application No. 21808126.3 (9 pages).
Second China Office Action, dated Oct. 14, 2024 for corresponding China application No. 202180031305.7 with English translation (12 pages).

\* cited by examiner

DEHUMIDIFYING MEMBER, DEHUMIDIFYING ROTOR, AND MANUFACTURING METHOD OF DEHUMIDIFYING MEMBER

CROSS-REFERENCE TO RELATED APPLICATIONS

This application is a U.S. National Phase application, under 35 U.S.C. § 371, of International Application no. PCT/JP2021/018770, with an international filing date of May 18, 2021, and claims priority to Japanese application no. 2020-088096 filed on May 20, 2020, each of which is hereby incorporated by reference for all purposes.

TECHNICAL FIELD

The disclosure of the present application relates to a dehumidifying member, a dehumidifying rotor, and a manufacturing method of a dehumidifying member.

BACKGROUND ART

Some manufacturing sites such as a factory may need dry air from which moisture has been removed. For example, in a semiconductor manufacturing factory, there is an increased demand for dry air from which moisture, which may cause oxidation, has been removed as much as possible. As a device for supplying dry air, a dehumidifying device equipped with a dehumidifying rotor that carries silica gel or zeolite in a honeycomb structure is known (see Patent Literature 1).

The dehumidifying device equipped with a dehumidifying rotor is divided into a treatment zone and a reproduction zone as illustrated in FIG. 6 of Patent Literature 1, for example, and the dehumidifying rotor is rotated to move through the treatment zone, the reproduction zone, the treatment zone, the reproduction zone, . . . sequentially at a predetermined speed. Further, when located in the treatment zone, the dehumidifying rotor adsorbs moisture from high humidity air, and when located in the reproduction zone, the dehumidifying rotor releases moisture adsorbed to the dehumidifying rotor and thereby reproduces the dehumidifying function of the dehumidifying rotor. Such repetition of moisture absorption to the dehumidifying rotor and moisture removal from the dehumidifying rotor enables a continuous operation of the dehumidifying device.

As a manufacturing method of a dehumidifying rotor, a method including the following steps is disclosed in Patent Literature 1, for example.
  (1) A paper sheet is fed between a pair of forming rollers having a desired teeth shape, and thereby a wave-shaped paper sheet is formed.
  (2) A waterglass adhesive agent is applied to one side of the wave top portions of the wave-shaped paper sheet, the wave-shaped paper sheet is then adhered to a porous paper sheet, and subsequently, the adhered paper sheets are wound while the waterglass adhesive agent is applied to the other side of the wave top portion of the wave-shaped sheet, and thereby a cylindrical molded body having honeycomb structure is obtained.
  (3) The molded body is submerged in an aqueous solution of waterglass, subjected to drying and acid treatment, and thereby silica gel is deposited onto the molded body.

Further, Patent Literature 2 discloses another manufacturing method of a dehumidifying rotor including the following steps.
  (1) First, a honeycomb structure is fabricated.
  (2) The fabricated honeycomb structure is impregnated with slurry containing silica gel, dried, then burned, and thereby a honeycomb structure carrying silica gel is formed.

CITATION LIST

Patent Literature

Patent Literature 1: Japanese Patent Application Laid-Open No. S61-252497
Patent Literature 2: Japanese Patent No. 4958459

SUMMARY OF INVENTION

Technical Problem

Either an increase in scale of a factory or an increase in required dehumidifying performance may require an increase in size of a dehumidifying rotor. In a case of a larger dehumidifying rotor, compression force works on the upper side in the perpendicular direction because of the weight of the dehumidifying rotor when viewed from the center of rotation of the dehumidifying rotor. On the other hand, force in a direction in which an adhesion portion of the honeycomb structure is peeled off works on the lower side in the perpendicular direction when viewed from the center of rotation of the dehumidifying rotor because of the weight of the dehumidifying rotor.

Further, when the dehumidifying rotor is incorporated in a dehumidifying device, a dehumidifying member may be fixed by a sheet metal. In such a case, if the dehumidifying rotor is expanded or contracted by moisture adsorption and desorption, a tensile stress may occur at the adhesion portion of the honeycomb structure causing peeling off. Thus, a more robust adhesion portion of the honeycomb structure is desired.

However, the dehumidifying rotor disclosed in Patent Literature 1 increases the amount of silica gel deposition and thus is manufactured by steps of (1) using a paper sheet having an extremely small density of inorganic fibers forming the honeycomb structure to impregnate waterglass into deep inside of the paper sheet, (2) using waterglass as an adhesive agent used for forming the honeycomb structure, and (3) gelating the waterglass into silica gel through acid treatment. Thus, there is a problem of there being no choice other than waterglass for the adhesive agent when it is intended to increase the amount of silica gel deposition on the dehumidifying rotor.

In contrast, the dehumidifying rotor disclosed in Patent Literature 2 is manufactured by impregnating a honeycomb structure with silica gel slurry, and drying, then heating, and burning the impregnated honeycomb structure. However, the inventors have newly found a problem that the tensile strength of the honeycomb structure is very low, that is, interlayer peeling in the honeycomb structure is likely to occur in the manufacturing method of the dehumidifying rotor disclosed in Patent Literature 2, as illustrated in a comparative example described later.

The disclosure of the present application has been made in order to solve the problem described above, and according to a thorough study, it has been newly found that it is possible to provide a dehumidifying member having a high tensile strength by forming a contact part between a planar base material and a corrugated base material, which form a honeycomb structure, by using an adhesion part adhered with an adhesive agent and using silica gel formed on an air hole side from the adhesion part.

That is, an object of the disclosure of the present application is to provide a dehumidifying member having a high tensile strength, a dehumidifying rotor including the same, and a manufacturing method of the dehumidifying member.

Solution to Problem

The disclosure of the present application relates to a dehumidifying member, a dehumidifying rotor, and a manufacturing method of a dehumidifying member illustrated below.

(1) A dehumidifying member comprising a honeycomb structure,
wherein the honeycomb structure includes
a planar base material and a corrugated base material, and
a contact part where a wave top portion of the corrugated base material and the planar base material are in contact with each other, and
an air hole,
wherein the contact part includes
an adhesion part adhered with an adhesive agent, and
silica gel formed on the air hole side from the contact part, and
wherein a component forming the adhesive agent differs from a component of the silica gel formed on the air hole side from the adhesion part.

(2) The dehumidifying member according to (1) above, wherein the planar base material and/or the corrugated base material is mixed paper.

(3) The dehumidifying member according to (2) above, wherein the mixed paper contains silica gel in space between fibers, and
wherein the volume of voids in the silica gel contained in the mixed paper is larger than the volume of voids of silica gel formed on the air hole side from the adhesion part.

(4) The dehumidifying member according to any one of (1) to (3) above, wherein the adhesive agent contains an organic component.

(5) A dehumidifying rotor including the dehumidifying member according to any one of (1) to (3) above.

(6) A dehumidifying rotor including the dehumidifying member according to (4) above.

(7) A manufacturing method of a dehumidifying member, the manufacturing method comprising:
a carrying step of causing a honeycomb structure to carry a sodium silicate solution; and
a silica gel synthesis step of synthesizing silica gel by performing acid treatment on sodium silicate carried in the honeycomb structure by the carrying step,
wherein the honeycomb structure includes
a planar base material and a corrugated base material,
an adhesion part that adheres a wave top portion of the corrugated base material and the planar base material to each other, and
an air hole.

(8) The manufacturing method according to (7) above, wherein the planar base material and/or the corrugated base material is mixed paper.

(9) The manufacturing method according to (7) or (8), wherein the adhesive agent contains an organic component.

Advantageous Effect

According to the disclosure of the present application, it is possible to provide a dehumidifying member having a higher tensile strength than a conventional dehumidifying member.

BRIEF DESCRIPTION OF DRAWINGS

FIG. 9B is a SEM photograph of a cross section of glass paper forming a honeycomb structure of the dehumidifying member fabricated in Example 1.

DETAILED DESCRIPTION OF EMBODIMENTS

A dehumidifying member, a dehumidifying rotor, and a manufacturing method of a dehumidifying member disclosed in the present application will be described below in detail.

First Embodiment of Dehumidifying Member

Figure 1:
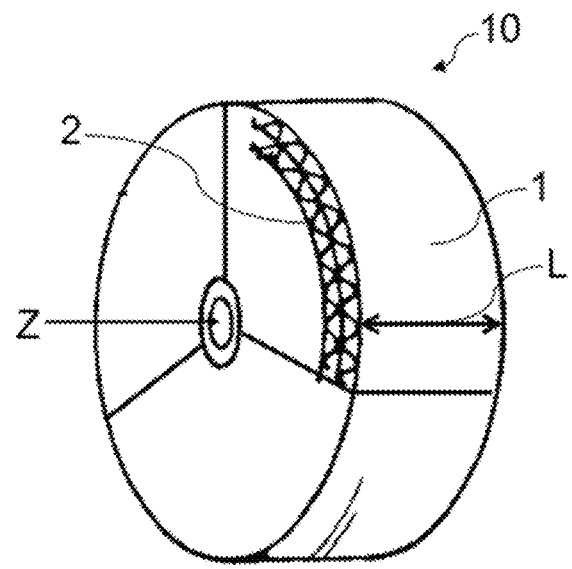
FIG. 1 is a perspective view illustrating an overview of a dehumidifying rotor and dehumidifying members according to a first embodiment.
Figure 2:
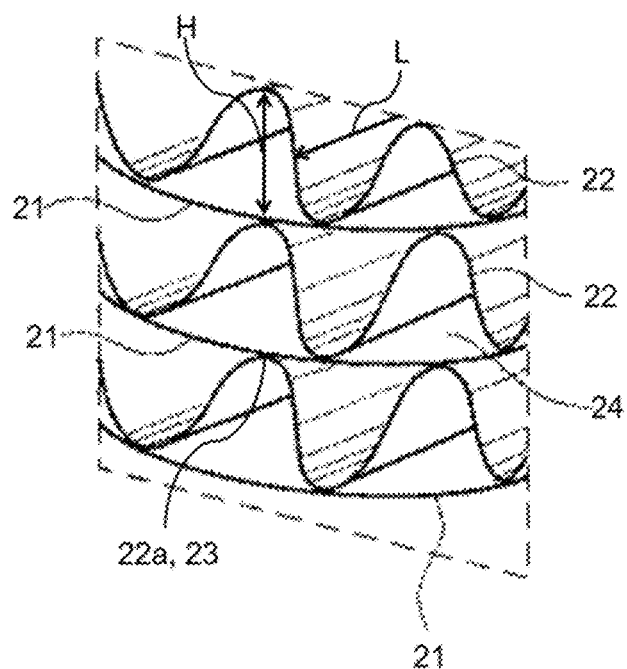
FIG. 2 is a diagram illustrating an overview of a honeycomb structure when the dehumidifying member is viewed in a direction of the center axis of rotation of the dehumidifying rotor of FIG. 1.
Figure 3:
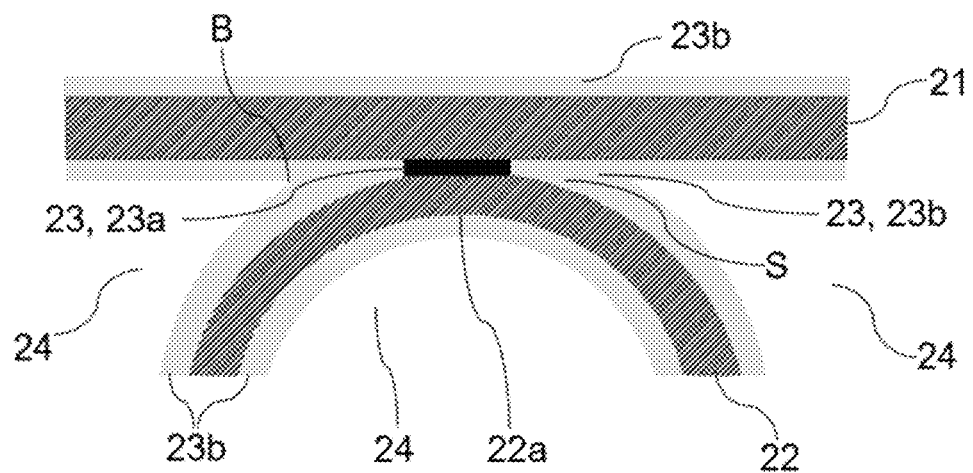
FIG. 3 is a schematic enlarged sectional view of a contact part of the honeycomb structure.

The dehumidifying member according to a first embodiment will be described with reference to FIG. 1 to FIG. 3. FIG. 1 is a perspective view illustrating the overview of a dehumidifying rotor 10 and dehumidifying members 1. FIG. 2 is a diagram illustrating the overview of a honeycomb structure 2 when the dehumidifying member 1 is viewed in the Z direction that is the center axis of rotation of the dehumidifying rotor 10 of FIG. 1. FIG. 3 is a schematic enlarged sectional view of a contact part 23 of the honeycomb structure 2.

The dehumidifying member 1 according to the first embodiment is one of sections divided into one or more from the dehumidifying rotor 10. Although an example in which three dehumidifying members 1 are combined to form the dehumidifying rotor 10 is illustrated in the example illustrated in FIG. 1, any number of dehumidifying members 1 forming the dehumidifying rotor 10 may be employed. Further, the dehumidifying rotor 10 may be formed of a single dehumidifying member 1.

The dehumidifying member 1 has the honeycomb structure 2. The honeycomb structure 2 includes planar base materials 21, corrugated base materials 22, contact parts 23 where wave top portions 22a of each corrugated base material 22 and each planar base material 21 are in contact with each other, and air holes 24. Each contact part 23 includes an adhesion part 23a adhered with an adhesive agent and silica gel 23b formed on the air hole side from the adhesion part 23a.

While described later in detail with a manufacturing method described below, the dehumidifying member 1 is made by, first, manufacturing the honeycomb structure 2 including the adhesion parts 23a, subsequently causing the honeycomb structure 2 to carry a sodium silicate solution, and then synthesizing the silica gel 23b from sodium silicate through acid treatment (hereafter, silica gel synthesized from sodium silicate may be referred to as "synthesized silica gel"). Once the honeycomb structure 2 is submerged in the sodium silicate solution, the sodium silicate solution is filled in space S formed by the adhesion part 23a, the planar base material 21, and the corrugated base material 22. Thus, the adhesion part 23a is covered with the synthesized silica gel 23b. Note that, in the manufacturing method disclosed in the present specification, the synthesized silica gel 23b is formed entirely around the planar base material 21 and the corrugated base material 22 that form the honeycomb structure 2. In the present specification, as illustrated in FIG. 3, the silica gel 23b included in the contact part 23 means the synthesized silica gel 23b on the adhesion part 23a side from the boundary B between the synthesized silica gel 23b formed around the planar base material 21 and the synthesized silica gel 23b formed around the corrugated base material 22. In other words, the silica gel 23b included in the contact part 23 may refer to, in the synthesized silica gel 23b, a portion which is in contact with both the planar base material 21 and the corrugated base material 22.

For the planar base material 21 and the corrugated base material 22 of the dehumidifying member 1 according to the first embodiment, any fibrous base material known in this technical field can be used. Specific examples of the fiber base material may be, for example, inorganic fiber such as silica and alumina fiber, silica fiber, alumina fiber, mullite fiber, glass fiber, rock wool fiber, carbon fiber, or the like; or organic fiber such as polyethylene fiber, polypropylene fiber, nylon fiber, polyester fiber, polyvinyl alcohol fiber, polyethylene terephthalate fiber, aramid fiber, pulp fiber, rayon fiber, or the like. Further, each of these fibers may be of a single type or a combination of two or more types. Note that the fibers described above are mere examples, and the embodiment is not limited to these fibers. Further, the planar base material 21 and the corrugated base material 22 may be made by using the same type of fiber or using different types of fiber.

With respect to the fiber of the dehumidifying member 1 according to the first embodiment, if the density thereof is too low, the strength of the honeycomb structure will decrease, and if the density thereof is too high, the amount of silica gel carried between fibers will decrease. Therefore, the density of fibers can be selected as appropriate taking the strength, the amount of the honeycomb structure (the amount of moisture adsorption), or the like into consideration. The density of fibers of the dehumidifying member 1 according to the first embodiment may be, for example, 0.05 to 0.5 $g/cm^3$, preferably 0.08 to 0.3 $g/cm^3$, more preferably 0.1 to 0.2 $g/cm^3$, or the like.

The adhesive agent forming the adhesion part 23a is not particularly limited as long as it can adhere the planar base material 21 and the wave top portion 22a of the corrugated base material 22 to each other. For example, an inorganic adhesive agent or an organic adhesive agent may be used. Examples of the inorganic adhesive agent may be a silica-based adhesive agent, water glass, or the like. Further, the organic adhesive agent may be an acrylic resin-based adhesive agent, an acrylic resin emulsion adhesive agent, an α-olefine-based adhesive agent, an urethan resin-based adhesive agent, an urethan resin emulsion adhesive agent, an ether-based cellulose, an ethylene-vinyl acetate resin emulsion adhesive agent, an epoxy resin-based adhesive agent, an epoxy resin emulsion adhesive agent, a vinyl chloride resin solvent-based adhesive agent, a chloroprene rubber-based adhesive agent, a vinyl acetate resin emulsion adhesive agent, a cyanoacrylate-based adhesive agent, a silicone-based adhesive agent, an aqueous polymer-isocyanate-based adhesive agent, a styrene-butadiene rubber solution-based adhesive agent, a styrene-butadiene rubber-based latex adhesive agent, a nytril rubber-based adhesive agent, a polyimide-based adhesive agent, a polyvinyl alcohol based adhesive agent, a starch-based adhesive agent, a natural rubber-based adhesive agent, or the like.

The adhesive agent can be selected as appropriate in accordance with the material of the planar base material 21 and the corrugated base material 22. Further, the adhesive agent may be used in combination of two or more types selected from inorganic adhesive agents and organic adhesive agents. Further, a tackifier, a plasticizer, a curing agent, a cross-linking agent, a diluent, a filler, a thickener, a pigment, an anti-aging agent, an antioxidant, an antifoaming agent, a flame retardant, a preservative, a dispersant, a wetting agent, a hydrophilic agent, or the like may be added to the adhesive agent, if necessary.

The sodium silicate solution used for synthesizing the silica gel 23b is made by dissolving sodium silicate in water and is also referred to as "water glass". The sodium silicate solution can be fabricated by dissolving commercially available sodium silicate in water. If the concentration of the sodium silicate solution is too low, the amount thereof that can be carried in the honeycomb structure 2 by a single carrying step will be small. In contrast, if the concentration of the sodium silicate solution is too high, the air holes 24 of the honeycomb structure 2 may be clogged. Therefore, the concentration of the sodium silicate may be suitably set so that a desired amount thereof can be carried and the air holes 24 are not clogged. The concentration of the sodium silicate solution may be, for example, 20 to 50% by mass, preferably 25 to 45% by mass, and more preferably 30 to 40% by mass.

The dehumidifying member 1 according to the first embodiment is made by, first, adhering the planar base materials 21 and the wave top portions 22a of the corrugated base materials 22 to each other by using an adhesive agent to fabricate the honeycomb structure 2. Unlike the art of Patent Literature 2, the dehumidifying member 1 according to the first embodiment is not required to be burned. Therefore, an adhesive agent that is relatively susceptible to heat can also be used, and this provides wider choices of types of adhesive agents to be used.

Further, as described in Patent Literature 1, sodium silicate (water glass) can be used as an adhesive agent. In the dehumidifying member 1 according to the first embodiment, however, an adhesive agent having a high adhesive effect can be selected for the adhesion part 23a. Therefore, the component of the adhesion part 23a adhered with the adhesive agent and the component of the synthesized silica gel 23b formed on the air hole side from the adhesion part 23a are different from each other. Note that, in the present specification, components being different means that the component of the entire adhesive agent differs from the component of the synthesized silica gel 23b and does not prevent a part of the component of the adhesive agent from being the same as the component of the synthesized silica gel.

Effects obtained due to the different components of the adhesion part 23a adhered with the adhesive agent and the synthesized silica gel 23b formed on the air hole side from the adhesion part 23a may be an effect of the improved strength of the honeycomb structure, because the adhesive strength is enhanced by the anchor effect by different types of adhesive agents, an effect of cost reduction or added functionality due to improved design flexibility provided by the use of different types of adhesive agents, or the like. In contrast, when sodium silicate is used as the adhesive agent, for example, the adhesive agent deposited and solidified on the adhesion part 23a may be melted in the step of causing a sodium silicate solution to be carried, and a molded body as a dehumidifying member may not be maintained. In such a case, it is considered that the use of a different adhesive agent unsusceptible to a sodium silicate solution as the adhesive agent can provide an effect of preventing the above phenomenon. The adhesive agent unsusceptible to a sodium silicate solution may be, for example, an acrylic resin emulsion adhesive agent, an ethylene-vinyl acetate resin emulsion adhesive agent, or the like.

Further, another effect obtained due to the different components of the adhesion part 23a adhered with the adhesive agent and the synthesized silica gel 23b formed on the air hole side from the adhesion part 23a may be in that a survey of the distribution or the amount of deposition or the like of the adhesive agent will contribute to analysis of a cause for occurrence of a product failure.

Second Embodiment of Dehumidifying Member

The second embodiment of the dehumidifying member 1 will be described. The dehumidifying member 1 according to the second embodiment differs from the dehumidifying member 1 according to the first embodiment in that the planar base material 21 and/or the corrugated base material 22 is mixed paper and, for other features, is the same as the dehumidifying member 1 according to the first embodiment. Accordingly, in the second embodiment, features different from those of the first embodiment will be mainly described, and repeated description for the features that have already been described in the first embodiment will be omitted. Thus, even though not explicitly described in the second embodiment, it is apparent that the features that have already been described in the first embodiment can be employed in the second embodiment.

In the present specification, the mixed paper means a sheet-like base material made with hygroscopic particles such as silica gel, zeolite, silica alumina amorphous porous bodies, mesoporous silica, ion exchange resin, polyacrylate resin, alkylene oxide resin, or the like filled in space between fibers of a fibrous base material forming the planar base material 21 and the corrugated base material 22 illustrated as an example in the first embodiment. The mixed paper is fabricated by making a fiber solution containing dispersed hygroscopic fine particles into a sheet shape. The type of silica gel can be selected as appropriate in accordance with the purpose. For example, the A-type that is superior in moisture absorbency at a low humidity or the B-type that is superior in moisture absorbency at a high humidity can be selected in accordance with the purpose. Alternatively, silica gel of the A-type and silica gel of the B-type may be mixed.

Note that hygroscopic fine particles contained in mixed paper is in a form in which fine particles are aggregated in space between fibers in a manufacturing process. On the other hand, the synthesized silica gel 23b formed on the air hole side from the adhesion part 23a is fabricated by performing acid treatment on sodium silicate impregnated into the honeycomb structure 2. Thus, the volume of voids in the hygroscopic fine particles contained in the mixed paper is larger than the volume of voids in the synthesized silica gel 23b formed on the air hole side from the adhesion part 23a. Note that, in the present specification, the term "volume of voids" differs from the specific surface area representing the pore surface area inside a hygroscopic fine particle and means the volume per unit volume of space formed in space between fine particles. The term "volume of voids" can be determined by capturing an image of fine particles by SEM or the like and performing comparison based on the coarseness in appearance. When fine particles are aggregated more randomly, the "volume of voids" will be larger, and the appearance of a SEM image is coarser (fine unevenness is observed). In contrast, when the "volume of voids" is smaller, fine particles are formed more densely, and therefore, the appearance of a SEM image will be smoother.

Further, the "volume of voids" does not mean the volume of space between individual fine particles but means the volume of voids in a region where a predetermined amount of fine particles are aggregated (coarseness or smoothness in the appearance). The region where a predetermined amount of fine particles are aggregated means any region where fine particles viewed from a SEM image are aggregated. Therefore, a crack or the like formed in the surface are not included in the region. In other words, the region does not mean the entire surface observed in a SEM image but just means a portion where fine particles are aggregated.

Note that the difference between a mass of hygroscopic fine particles contained in mixed paper and the synthesized silica gel 23b may be expressed by using a term of "surface smoothness", "surface property", or "surface coarseness" instead of "volume of voids". Further, the difference between a mass of hygroscopic fine particles contained in mixed paper and the synthesized silica gel 23b viewed from a SEM image may be expressed as follows.

hygroscopic fine particles having an uneven surface where granulocytes are aggregated versus synthesized silica gel having a block shape whose surface is relatively flat.

hygroscopic fine particles having a rough surface versus synthesized silica gel having a smooth surface.

Third Embodiment of Dehumidifying Member

The third embodiment of the dehumidifying member 1 will be described with reference to FIG. 4. The dehumidifying member 1 according to the third embodiment differs from the dehumidifying member 1 according to the first and second embodiments in that the honeycomb structure 2 is formed such that the planar base materials 21 are laminated with the wave top portions 22a of the corrugated base material 22 being adhered to respective planar base materials 21, in other words, such that the planar base materials 21 are substantially parallel to each other and, for other features, is the same as the dehumidifying member 1 according to the first and second embodiment. Accordingly, in the third embodiment, features different from those of the first and second embodiments will be mainly described, and repeated description for the features that have already been described in the first and second embodiments will be omitted. Thus, even though not explicitly described in the third embodiment, it is apparent that the features that have already been described in the first and second embodiments can be employed in the third embodiment.

The dehumidifying member 1 according to the third embodiment can be made by adhering the wave top portions 22a of the corrugated base material 22 to the planar base material 21, cutting the planar base material 21 and the corrugated base material 22 into a predetermined length, and laminating the cut base materials one on another. The form of lamination may be alternate lamination such as the planar base material 21, the corrugated base material 22, the planar base material 21, and the corrugated base material 22 in this order. Alternatively, sets of the planar base material 21, the corrugated base material 22, and the planar base material 21 in this order may be fabricated, and the planar base materials 21 of these sets may be adhered to each other. Further, although FIG. 4 illustrates an example of the honeycomb structure 2 of alternate lamination such that the vent directions of the air holes 24 are each shifted by 90 degrees, the directions in which the air holes 24 are formed may be the same. Note that the same form of lamination applies to the first embodiment and the second embodiment.

Embodiment of Dehumidifying Rotor

An embodiment of the dehumidifying rotor 10 will be described with reference to FIG. 1 and FIG. 4. The dehumidifying rotor 10 can be fabricated by combining the dehumidifying members 1 according to the first and second embodiments. As long as the dehumidifying members 1 according to the first and second embodiments are used, the fabrication procedure of the dehumidifying rotor 10 is not particularly limited. For example, FIG. 1 illustrates an example of fabricating the dehumidifying rotor 10 by (1) winding the planar base material 21 and the corrugated base material 22 into a roll while adhering the wave top portions 22a of the corrugated base material 22 to the planar base material 21 to manufacture a rotor, (2) dividing the rotor and causing each of the divided rotors to carry a sodium silicate solution, (3) performing acid treatment on sodium silicate to synthesize the silica gel 23b to fabricate the dehumidifying members 1, and (4) combining the fabricated dehumidifying members 1. Alternatively, the rotor may be used as it stands without being divided in the step of (2) described above.

Figure 4:
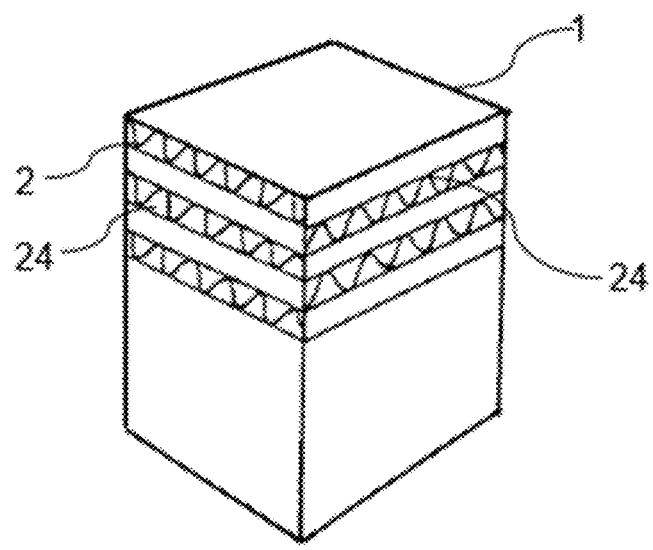
FIG. 4 is a perspective view illustrating an overview of a dehumidifying member according to a third embodiment.

Further, when the dehumidifying member 1 according to the third embodiment illustrated in FIG. 4 is used to fabricate the dehumidifying rotor 10, the dehumidifying member 1 can be cut into suitable shapes, and the cut members can then be combined.

Embodiment of Manufacturing Method of Dehumidifying Member

The manufacturing method of a dehumidifying member includes:
    a carrying step of causing a honeycomb structure to carry a sodium silicate solution; and
    a silica gel synthesis step of synthesizing silica gel by performing acid treatment on sodium silicate carried in the honeycomb structure by the carrying step.

Since the honeycomb structure and the sodium silicate solution have already been described, the detailed description thereof will be omitted. Acid used in the silica gel synthesis step is not particularly limited as long as silica gel can be synthesized from the sodium silicate solution. The acid may be, for example, sulfuric acid, phosphoric acid, nitric acid, hydrochloric acid, and a metal salt of such acid, for example, an aluminum salt such as aluminum sulfate or aluminum nitrate, a calcium salt such as calcium nitrate or calcium chloride, a magnesium salt such as magnesium sulfate or magnesium chloride, or an iron salt such as iron sulfate or iron nitrate. The acid and the metal salt of the acid listed above may be used alone or may be used in combination. Further, the synthesized silica gel 23b may be the A-type or may be the B-type. Synthesis can be made to have a desired type in accordance with the purpose by a method of changing the concentration of the acid treatment or the like. Note that, when an aluminum salt is used as acid in synthesis of silica gel from a sodium silicate solution, silica-alumina gel is obtained. In the present specification, when "synthesized silica gel" is referred to, the "synthesized silica gel" encompasses silica gel containing a metal salt derived from acid.

While Examples are provided below to specifically describe the embodiments disclosed in the present application, these Examples are solely provided for the purpose of illustration of the embodiments. These Examples are not intended to limit or restrict the scope of the present invention disclosed in the present application.

EXAMPLES

Manufacture of Dehumidifying Member

Material

The following products were used as materials. Note that ratios are represented as % by mass.

Base Material

TABLE 1

| Material | Glass paper | Mixed paper |
| --- | --- | --- |
| Silica gel |  | 65% |
| Glass fiber | 75% | 15% |
| Organic fiber | 25% | 20% |

Note that SYLYSIA 740 (Type A silica gel, Fuji SYLYSIA Chemical LTD.) was used for silica gel. Further, the basis weight (g/cm$^2$) of the fabricated base material was 20 for the glass paper and 83 for the mixed paper, and the thickness (μm) was 101 for the glass paper and 197 for the mixed paper.

Adhesive Agent

TABLE 2

| Material | For glass paper | For mixed paper |
| --- | --- | --- |
| Colloidal silica (solid content) | 40% | 32% |
| Vinyl acetate emulsion (solid content) | 8% |  |
| Acrylic emulsion (solid content) |  | 13% |
| Ion exchange water | 52% | 55% |

Sodium Silicate Solution

TABLE 3

| Material | Ratio |
|---|---|
| No. 2 sodium silicate | 89% |
| Ion exchange water | 11% |

Acid Treatment Liquid

TABLE 4

| Material | Ratio |
|---|---|
| Aluminum sulfate salt | 18% |
| Ion exchange water | 82% |

Silica Gel Slurry Solution

TABLE 5

| Material | Ratio |
|---|---|
| Type A silica gel | 24% |
| Colloidal silica (solid content) | 7% |
| Ion exchange water | 69% |

Example 1

Fabrication of Dehumidifying Member

The dehumidifying member was fabricated by the following procedure.
(1) Glass paper was used as the planar base material and the corrugated base material. The glass paper was corrugate-processed by using an adhesive agent, and the corrugate-processed paper sheet was wound into a spiral shape with an adhesive agent to fabricate a rotor-type honeycomb structure having a diameter of 450 mm, a flute length of 210 mm, and a flute height of 1.9 mm. Note that the flute length means the length of the wave top portion 22a of the corrugated base material 22 (the thickness of the dehumidifying rotor) (see "L" in FIG. 1 and FIG. 2), and the flute height means the distance between the wave top portion 22a and the planar base material 21 (see "H" in FIG. 2).
(2) After the fabricated honeycomb structure was submerged in the sodium silicate solution (otherwise, means for spraying or sprinkling by using a spray, a sprinkler, or the like may be employed as carrying means for causing sodium silicate to be carried), the honeycomb structure was taken out of the sodium silicate solution.
(3) After subjected to air blow, the honeycomb structure carrying the sodium silicate solution was submerged in an acid treatment liquid, and hydrogel of aluminum silicate was produced by a chemical reaction of sodium silicate in the honeycomb structure with aluminum sulfate.
(4) The honeycomb structure was heated and dried to obtain a dehumidifying member reinforced by silica gel.

Evaluation Method of Tensile Strength of Dehumidifying Member

Figure 5:
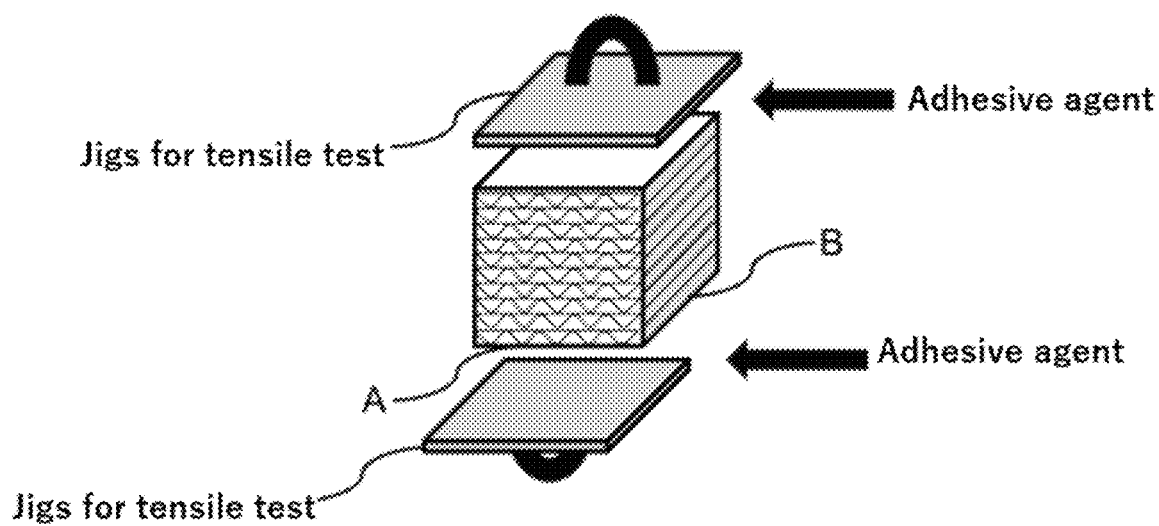
FIG. 5 is a schematic diagram illustrating an evaluation method of the tensile strength of a dehumidifying member.

The evaluation method of the tensile strength of the dehumidifying member will be described with reference to FIG. 5. The tensile strength was evaluated in the following procedure.

(1) The fabricated dehumidifying member was cut into a cubic shape of 5 cm$^3$ so as to be parallel to the laminating direction, and the cut member was used as a test sample for tensile strength measurement.
(2) The test sample was dried at 110° C. for 1 hour, the weight was measured by an electronic scale, and the lengths of three sides were measured by a caliper.
(3) Jigs for tensile test were adhered to the top and the bottom in the laminating direction of the honeycomb structure of the test sample, respectively, by using an epoxy adhesive agent.
(4) The test sample was attached to a tensile test machine (Shimadzu Corporation, Shimadzu Compact Desktop Testing Machine Ez-LX), a tensile load was continuously added to the test sample at 1 mm/min, and the load at break was found by the minimum unit of 1 N.
(5) The tensile strength in the laminating direction was found by the following equation.

$$\sigma = F/(A \times B),$$

where $\sigma$: tensile strength [N/cm$^2$], F: load at break of the test sample [N], A: A-dimension of the test sample [cm], and B: B-dimension of the test sample [cm].

Figure 6:
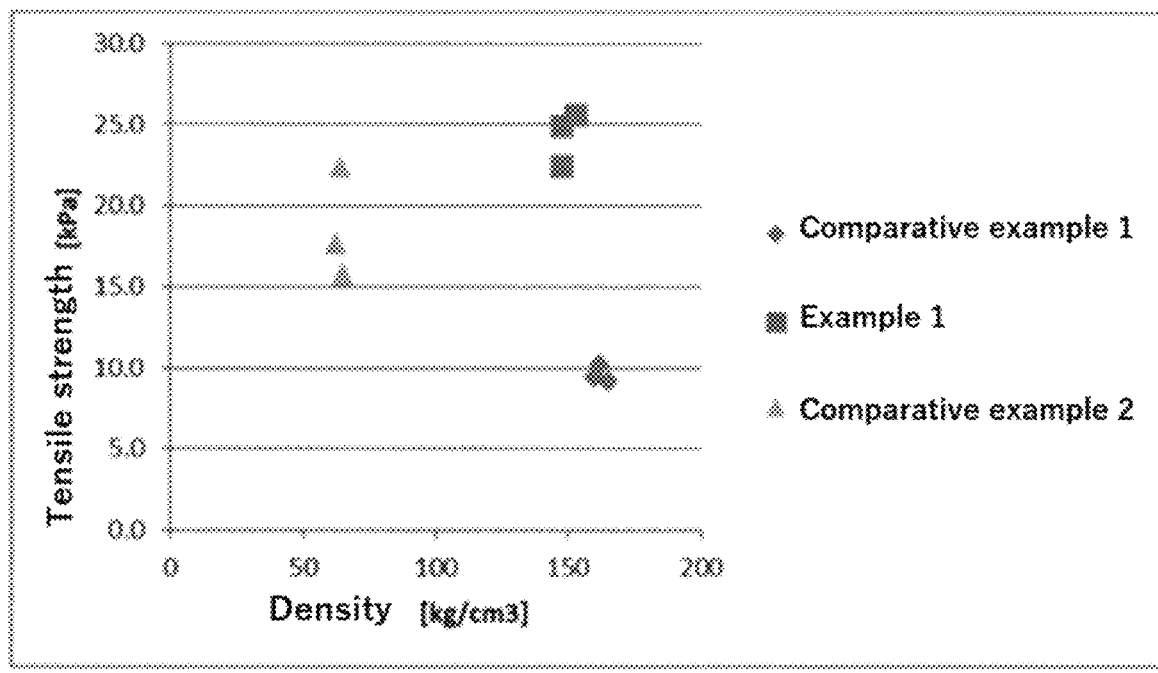
FIG. 6 is a graph illustrating measurement results for the tensile strength of dehumidifying members fabricated in Example 1 and Comparative example 1 and a honeycomb structure fabricated in Comparative example 2.

The tensile strength was evaluated for three test samples. FIG. 6 illustrates the evaluation results. The mean value of the tensile strength was 24.3 kPa.

Comparative Example 1

A silica gel slurry solution was used instead of the sodium silicate solution of Example 1. After submerged in the silica gel slurry solution whose solid content concentration was adjusted so that the density of the fabricated dehumidifying member becomes substantially the same as that in Example 1, the member was dried at 150° C. and then burned at 500° C. for 1 hour, and thereby the dehumidifying member of Comparative example 1 was fabricated. The tensile strength of the fabricated dehumidifying member was evaluated in the same procedure as in Example 1. FIG. 6 illustrates the evaluation result. The mean value of the tensile strength was 9.6 kPa.

Comparative Example 2

The honeycomb structure fabricated in Example 1 (not submerged in the sodium silicate solution) was used for Comparative example 2. The tensile strength of Comparative example 2 was evaluated in the same procedure as in Example 1. FIG. 6 illustrates the evaluation result. The mean value of the tensile strength was 18.6 kPa.

As illustrated in FIG. 6, it was confirmed that the tensile strength is improved by covering the periphery of the adhesive agent of the honeycomb structure with the synthesized silica gel. The reason therefor is considered that the synthesized silica gel formed on the air hole side from the adhesion part of the honeycomb structure increases the adhesion area of the contact part and thus achieves the adhesion effect. In contrast, the dehumidifying member fabricated by the manufacturing method of submerging the honeycomb structure in the silica gel slurry disclosed in Patent Literature 2 had a lower tensile strength than the honeycomb structure. In the manufacturing method disclosed in Patent Literature 2, it is difficult to increase the amount of carried silica gel. Thus, a burning step is performed to improve the dehumidifying performance of the fabricated dehumidifying member. According to the disclosure of the present application, however, it was newly found that the tensile strength of the honeycomb structure is significantly reduced by the burning step in relation to the tensile strength in the manufacturing method of Patent Literature 2. The reason for the reduction in the tensile strength is considered that the organic component of the adhesive agent or the like was burned off by the burning step.

Further, in the manufacturing method disclosed in Patent Literature 2, to cause silica gel to be carried in the honeycomb structure, it is required to add colloidal silica having no dehumidifying function into the silica gel slurry. Thus, it is not possible to allow all the fine particles carried in the honeycomb structure to have a dehumidifying function. In contrast, in the dehumidifying member disclosed in the present application, since silica gel is synthesized from a sodium silicate solution, all the fine particles (synthesized silica gel) carried in the honeycomb structure achieve the dehumidifying function. It is therefore possible to improve the dehumidifying performance per unit weight.

Example 2

Figure 7:
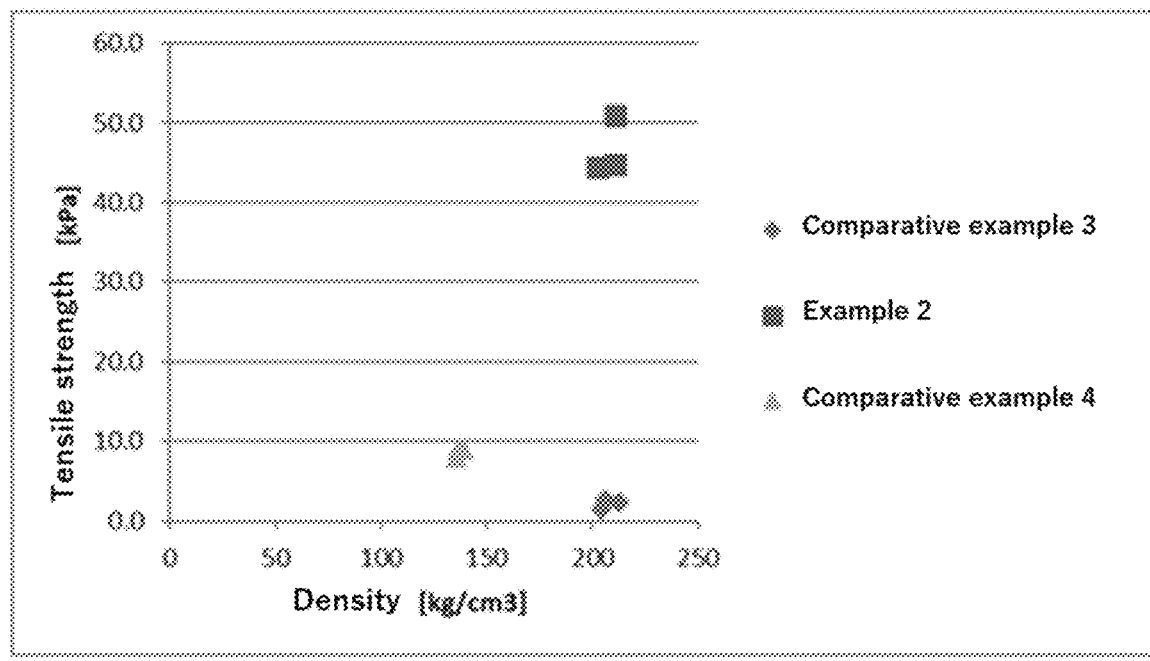
FIG. 7 is a graph illustrating measurement results for the tensile strength of dehumidifying members fabricated in Example 2 and Comparative example 3 and a honeycomb structure fabricated in Comparative example 4.

A dehumidifying member was fabricated in the same procedure as in Example 1 except that mixed paper was used instead of glass paper, and the tensile strength was evaluated. FIG. 7 illustrates the evaluation result. The mean value of the tensile strength was 46.8 kPa.

Comparative Example 3

A dehumidifying member was fabricated in the same procedure as in Comparative example 1 except that mixed paper was used instead of glass paper, and the tensile strength was evaluated. FIG. 7 illustrates the evaluation result. The mean value of the tensile strength was 2.1 kPa.

Comparative Example 4

The honeycomb structure with mixed paper fabricated in Example 2 (not submerged in the sodium silicate solution) was used for Comparative example 4. The tensile strength of Comparative example 4 was evaluated in the same procedure as in Example 1. FIG. 7 illustrates the evaluation result. The mean value of the tensile strength was 8.7 kPa.

As illustrated in FIG. 7, it was confirmed that the tensile strength is improved by covering the periphery of the adhesive agent of the honeycomb structure with the synthesized silica gel. Note that, in comparison between Example 1 and Comparative example 2, covering the periphery of the adhesive agent with silica gel increased the tensile strength by 1.3 times. On the other hand, in comparison between Example 2 and Comparative example 4, covering the periphery of the adhesive agent with silica gel increased the tensile strength by 5.4 times. That is, from the honeycomb structure fabricated by using the adhesive agent, the tensile strength was increased much more when mixed paper was used as the base material than when glass paper was used as the base material.

Figure 8:
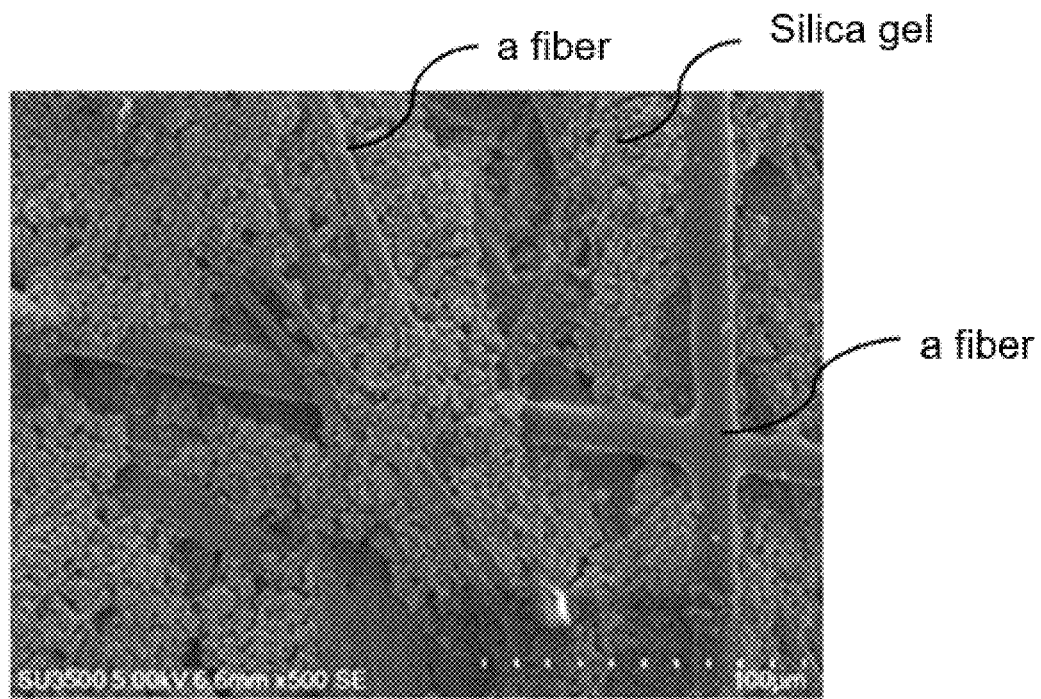
FIG. 8 is a photograph substitute for a drawing, which is a SEM photograph of the surface of mixed paper.

To elucidate the reason why the tensile strength is significantly increased compared to the honeycomb structure when the mixed paper is used as the base material, the surface of the base material and a cross section of the base material were captured by using SEM. First, FIG. 8 illustrates SEM photographs of the surface of the mixed paper. As illustrated in FIG. 8, it was confirmed that, in the mixed paper, silica gel was carried in space between fibers in a porous manner.

Next, SEM photographs of the surface and a cross section of the mixed paper forming the honeycomb structure of the dehumidifying member fabricated in Example 2 (FIG. 9A) and a SEM photograph of a cross section of glass paper forming the honeycomb structure of the dehumidifying member fabricated in Example 1 (FIG. 9B) are illustrated.

Figure 9:
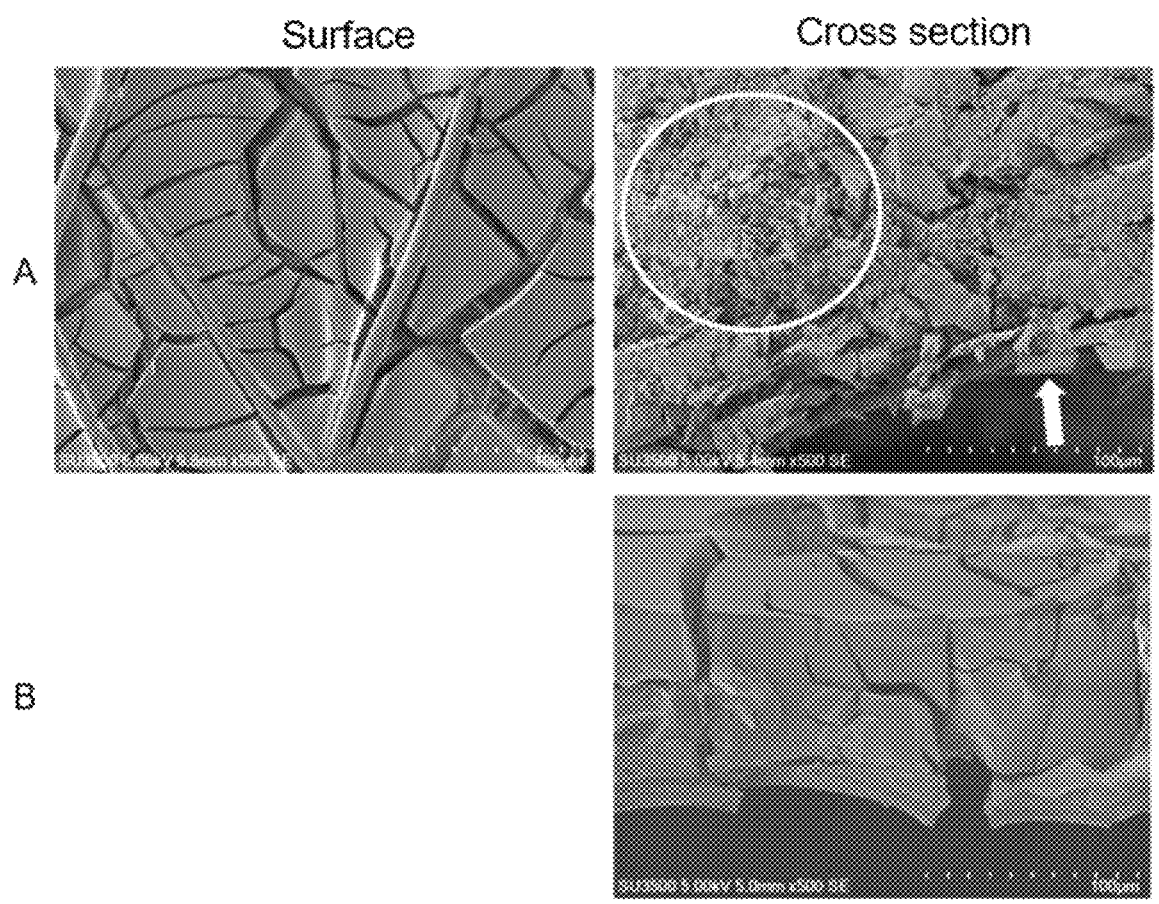
FIG. 9 are photographs substitute for a drawing, FIG. 9A represent SEM photographs of the surface and a cross section of mixed paper forming a honeycomb structure of the dehumidifying member fabricated in Example 2.

As illustrated in the SEM photographs of the surface in FIG. 9A, it was confirmed that the synthesized silica gel had a very smooth surface (less voids). Further, as illustrated in the SEM photograph of the cross section in FIG. 9A, it was confirmed that, in the dehumidifying member fabricated in Example 2, the synthesized silica gel was laminated (the part pointed by the arrow in the photograph of FIG. 9A) on the surface of the porous silica gel included in the mixed paper (the part surrounded by the circle in the photograph of FIG. 9A).

In contrast, as illustrated in the SEM photograph of the cross section in FIG. 9B, it was confirmed that, in the dehumidifying member fabricated in Example 1, silica gel synthesized by performing acid treatment on a sodium silicate solution from the surface to inside of the glass paper was integrally synthesized.

The following reasons are considered as to what caused the tensile strength of the dehumidifying member fabricated in Example 2 to be significantly higher than the dehumidifying member of Example 1.

(1) First, consideration is made on a part near the contact part of the honeycomb structure. As described above, the synthesized silica gel formed on the air hole side from the adhesion part increases the adhesion area of the contact part. The silica gel inside mixed paper is porous (with much unevenness). Thus, a sodium silicate solution enters space in the porous silica gel, a part of the synthesized silica gel is incorporated into the porous silica gel by the synthesis step, and this increases the integrity of the porous silica gel inside the mixed paper and the outside synthesized silica gel, that is, increases the adhesiveness between the porous silica gel and the outside synthesized silica gel. It is therefore considered that the synthesized silica gel of the space S part in FIG. 3 achieves the adhesion enhancement effect in cooperation with the porous silica gel included inside the planar base material 21 and the corrugated base material 22 in addition to the increase in the adhesion area of the contact part.

(2) Next, consideration is made on the planar base material and the corrugated base material as a whole. In the honeycomb structure of Example 2, only the surface of mixed paper is covered with dense synthesized silica gel while the porous portion inside the mixed paper is maintained. Thus, since the rigidity differs between the outside and the inside of the mixed paper that is the base material forming the honeycomb structure, force is likely to be distributed when tensile force is applied. In other words, when tensile force is applied to the honeycomb structure, the planar base material and the corrugated base material of the honeycomb structure are likely to distribute the tensile force, and as a result, distortion is less likely to be concentrated at the contact part 23. In contrast, in Example 1, as illustrated in FIG. 9B, since a part from the surface to inside of the glass paper is integrally formed of the synthesized silica gel, force is less likely to be distributed when tensile force is applied. It is therefore considered that, since applied tensile force is concentrated on the contact part 23, the tensile strength was reduced compared to the case of mixed paper.

In accordance with the above results, when a dehumidifying member is manufactured by the manufacturing method of a dehumidifying member disclosed in the present application, since a honeycomb structure is first fabricated and silica gel is then synthesized, choices of adhesive agents used for forming the honeycomb structure are increased. In particular, since the dehumidifying member disclosed in Patent Literature 2 intends to improve the dehumidifying performance with a burning step at about 500° C., it is not possible to use an adhesive agent whose combustion temperature is lower than 500° C. For the dehumidifying member disclosed in the present application, however, it is possible to use even an adhesive agent having a lower combustion temperature.

Further, the synthesized silica gel achieves an advantageous effect of notably improving the adhesion function at the contact part of a honeycomb structure in addition to the dehumidifying function of silica gel. That is, it was confirmed that two different advantageous effects are achieved. The tensile strength of the honeycomb structure formed from mixed paper is lower than the tensile strength of the honeycomb structure formed from glass paper (see Comparative examples 2 and 4). It was also confirmed however that, since the synthesized silica gel exhibits an adhesion effect to both the porous silica gel and the fibers included in mixed paper, the adhesion function of the synthesized silica gel is significantly superior when mixed paper is used as the base material forming a honeycomb structure.

INDUSTRIAL APPLICABILITY

According to the disclosure of the present application, the tensile strength of a dehumidifying member is improved. Therefore, the disclosure is useful for manufacturers of dehumidifying devices and the manufacturing industry requiring dehumidified air.

LIST OF REFERENCES 1 dehumidifying member
2 honeycomb structure
21 planar base material
22 corrugated base material
22a wave top portion
23 contact part
23a adhesion part
23b synthesized silica gel
24 air hole
10 dehumidifying rotor
B boundary
H flute height
L flute length
S space
Z center axis of rotation of a dehumidifying rotor

The invention claimed is:

1. A dehumidifying member comprising a honeycomb structure,
wherein the honeycomb structure includes
a planar base material and a corrugated base material, and
a contact part where a wave top portion of the corrugated base material and the planar base material are in contact with each other, and
an air hole,
wherein the contact part includes
an adhesion part adhered with an adhesive agent, and
synthesized silica gel, which is a silica gel synthesized from sodium silicate, formed on the air hole side from the adhesion part, and
wherein a component forming the adhesive agent differs from a component of the synthesized silica gel formed on the air hole side from the adhesion part,
wherein the planar base material and/or the corrugated base material is mixed paper,
wherein the mixed paper is a sheet-like base material made with hygroscopic particles filled in space between fibers of a fibrous base material forming the planar base material and/or the corrugated base material.

2. The dehumidifying member according to claim 1, wherein the hygroscopic particles are selected from the group consisting of silica gel, zeolite, silica alumina amorphous porous bodies, mesoporous silica, ion exchange polyacrylate resin, alkylene oxide resin and combinations thereof.

3. The dehumidifying member according to claim 2, wherein the adhesive agent contains an organic component.

4. A dehumidifying rotor including the dehumidifying member according to claim 3.

5. A dehumidifying rotor including the dehumidifying member according to claim 2.

6. The dehumidifying member according to claim 1,
wherein the mixed paper contains silica gel in space between fibers, and
wherein the volume of voids in the silica gel contained in the mixed paper is larger than the volume of voids of the synthesized silica gel formed on the air hole side from the adhesion part.

7. The dehumidifying member according to claim 6, wherein the adhesive agent contains an organic component.

8. A dehumidifying rotor including the dehumidifying member according to claim 7.

9. A dehumidifying rotor including the dehumidifying member according to claim 6.

10. The dehumidifying member according to claim 1, wherein the adhesive agent contains an organic component.

11. A dehumidifying rotor including the dehumidifying member according to claim 10.

12. A dehumidifying rotor including the dehumidifying member according to claim 1.

13. A manufacturing method dehumidifying member, the manufacturing method comprising:
a carrying step of causing a honeycomb structure to carry a sodium silicate solution; and
a silica gel synthesis step of synthesizing silica gel to form synthesized silica gel by performing acid treatment on sodium silicate carried in the honeycomb structure by the carrying step,
wherein the honeycomb structure includes
a planar base material and a corrugated base material,
an adhesion part adhered with an adhesive agent that adheres a wave top portion of the corrugated base material and the planar base material to each other, and
an air hole,
wherein the synthesized silica gel of the silica gel synthesis step forms, together with the adhesion part, a contact part where a wave top portion of the corrugated base material and the planar base material are in contact with each other,
wherein a component forming the adhesive agent differs from a component of the synthesized silica gel formed on the air hole side from the adhesion part,
wherein the planar base material and/or the corrugated base material is mixed paper, wherein the mixed paper is a sheet-like base material made with hygroscopic particles filled in space between fibers of the fibrous base material forming the planar base material and/or the corrugated base material.

14. The manufacturing method according to claim 13, wherein the hygroscopic particles are selected from the group consisting of silica gel, zeolite, silica alumina amorphous porous bodies, mesoporous silica, ion exchange resin, polyacrylate resin, alkylene oxide resin and combinations thereof.

15. The manufacturing method according to claim 14, wherein the adhesive agent contains an organic component.

16. The manufacturing method according to claim 13, wherein the adhesive agent contains an organic component.

* * * * *